United States Patent
Qvarth et al.

[11] Patent Number: 6,004,080
[45] Date of Patent: Dec. 21, 1999

[54] MILLING TOOL HAVING CUTTING INSERTS MOUNTED BY SERRATED SURFACES TO A ROTARY CARRIER

[75] Inventors: Ingemar Qvarth, Valbo; Lars-Erik Enquist, Sandviken, both of Sweden

[73] Assignee: Sandvik AB, Sandviken, Sweden

[21] Appl. No.: 09/172,295

[22] Filed: Oct. 14, 1998

[51] Int. Cl.[6] .................................................. B23C 5/24
[52] U.S. Cl. ........................... 407/36; 407/38; 407/41; 407/44; 407/46
[58] Field of Search ................................ 407/35, 36, 38, 407/40, 41, 43, 44, 45, 46, 47, 48

[56] References Cited

U.S. PATENT DOCUMENTS

| | | | |
|---|---|---|---|
| Re. 21,068 | 5/1939 | Miller | 407/35 X |
| 1,197,136 | 9/1916 | Lovejoy | 407/38 |
| 1,719,337 | 7/1929 | Miller | 407/38 |
| 1,964,130 | 6/1934 | Miller | 407/41 |
| 2,037,642 | 4/1936 | Scribner | 407/41 X |
| 2,306,798 | 12/1942 | Benninghoff | 407/41 X |
| 2,501,293 | 3/1950 | Sheridan . | |
| 3,214,825 | 11/1965 | Williams . | |
| 3,501,822 | 3/1970 | Williams . | |
| 5,529,493 | 6/1996 | Werner et al. . | |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A milling tool includes a supporting body that is rotatable around a central axis, and is being equipped with detachable cutting inserts. Each insert has two cutting edges extending at a given setting angle relative to each other. One of the cutting edges is located in a reference plane oriented perpendicular to the axis of rotation. In order to directly or indirectly connect each cutting insert with the supporting body a pair of serrated surfaces are provided, each of the serrated surfaces consisting of oblong, parallel ridges that are separated by grooves. A first one of the serrated surfaces is located at an inner side of the cutting insert, and the other one being directly or indirectly associated with the supporting body. The ridges and the grooves of the serrated surfaces are relative to the reference plane by an angle that constitutes one-half of the setting angle.

7 Claims, 2 Drawing Sheets

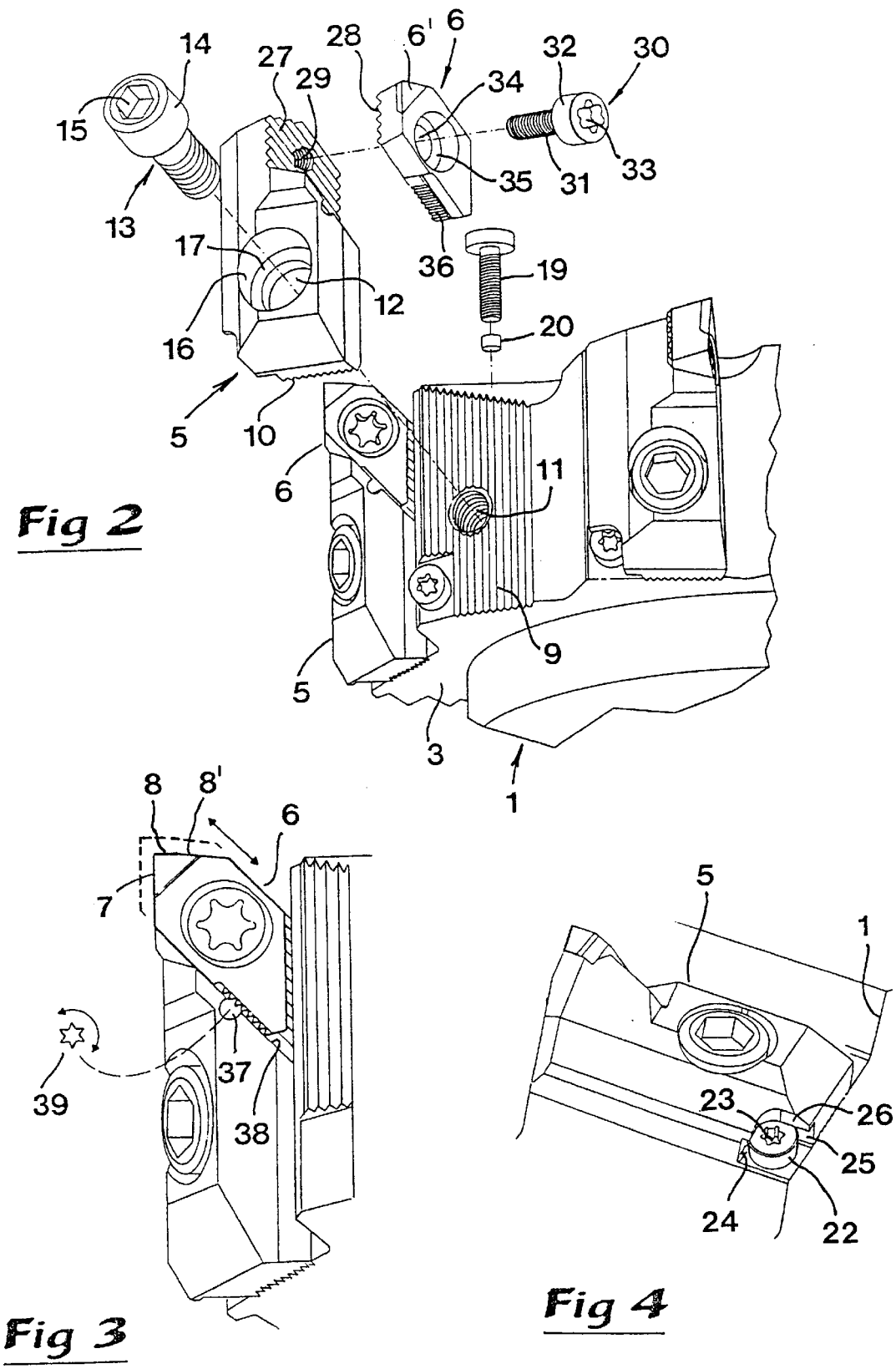

6,004,080

MILLING TOOL HAVING CUTTING INSERTS MOUNTED BY SERRATED SURFACES TO A ROTARY CARRIER

RELATED INVENTION

This invention is related to that disclosed in concurrently filed U.S. Ser. No. 09/172,293.

TECHNICAL FIELD OF THE INVENTION

The present invention relates to a milling tool comprising a supporting body being rotatable around a central geometric axis, said supporting body having an endless circumferential surface which extends between opposite end surfaces and is equipped with a number of detachable cutting inserts that are directly or indirectly connected with the supporting body by means of on one hand a screw coupling and on the other hand a pair of serrated surfaces. The surfaces comprise, in a known way, oblong, straight and parallel ridges separated by similar grooves, a first one of said serrated surfaces being located at an inner side of the cutting insert and the other one being directly or indirectly associated with the supporting body.

PRIOR ART

Milling tools of the type mentioned above are previously known from e.g., Werner et al. U.S. Pat. No. 5,529,439, U.S. Pat. No. 2,037,642, U.S. Pat. No. 3,214,825 and U.S. Pat. No. 3,501,822. It should be pointed out that it should be possible to adjust all of the cutting inserts of a milling tool into very precise working positions. In practice it is the question of tolerances in the magnitude of $\frac{1}{100}$ mm or less. Regarding such milling tools as corner milling cutters and facemilling cutters, it is vital that the edges of all of the cutting inserts during work are fine-adjusted not only in one single plane perpendicular to the axis of rotation of the supporting body, but also at an exactly defined radial distance from the axis of rotation. If the cutting inserts of an individual cutting insert are maladjusted relative to the edges of the rest of the cutting inserts so called warps arise, the consequence being that the maladjusted cutting insert and/or adjacent cutting inserts are subjected to an extraordinarily large load.

In connection with previously known milling tools the means for adjustment of the cutting elements in precise working positions are relatively complicated. This means that the adjusting operation in connection with the positioning of the cutting inserts is time-consuming.

The above-mentioned U.S. Pat. No. 2,037,642 describes a milling tool that uses clamping wedges for fixing cutting inserts, more precisely by having the clamping wedge and the cutting insert inserted together into and wedged up in radial recesses in the frame of the tool. In other words there is no screw coupling for fixing the cutting inserts to the supporting body. The serrations that are present in connection with the known design are provided between the cutting insert and the clamping wedge. Since the cutting inserts are wedged up, a precise adjustment is not achieved in practice.

U.S. Pat No. 2,501,293 describes a milling tool having a cutting insert that by means of a rotatable clamping element is attachable to a cassette that in turn is fixed against the frame of the tool by means of a combination of screw coupling and serrated surfaces more precisely, along a side of the cassette a serrated surface is provided. The ridges and grooves respectively of said serrated surface are oriented transversely relative to the direction of adjustment of the cassette. The screw coupling includes a screw provided in an oblong hole in the cassette. In this case the cutting insert itself is attached to the cassette that is adjustable relative to the frame, said cutting insert being void of any serrations. The adjustment of the cassette is effected in steps, i.e., in such a way that after removing of the clamping screw the cassette is displaced sidewards a distance that is at least equally large as the, width of the serrated grooves. Accordingly, no fine adjustment of the cassette is possible in connection with the known tool.

OBJECTS AND FEATURES OF THE INVENTION

The present invention aims at overcoming the shortcomings mentioned above in connection with previously known milling tools and creating an improved milling tool. Thus, a primary object of the invention is to create a milling tool whose cutting elements may be fine-adjusted in a simple, precise and time-saving way.

This object is achieved by a milling tool which comprises a carrier rotatable about a central axis. A carrier includes a plurality of serrated carrier surfaces spaced circumferentially about the axis. A plurality of cutting inserts is provided, each having a serrated insert surface. Each insert has its respective serrated insert surface meshed with a respective serrated carrier surface. Each of the serrated carrier surfaces and the serrated insert surfaces comprises straight parallel ridges which alternate with straight parallel grooves. Each cutting insert includes two cutting edges forming a setting angle with each other. One of the cutting edges lies in a reference plane oriented perpendicularly to the axis. The ridges and grooves of the serrated surfaces extend at an angle relative to the reference plane which equals one-half of the setting angle. Fasteners are provided for detachably securing respective inserts to the carrier.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 2 is an exploded perspective view illustrating a portion of the supporting body and a cassette and a cutting insert being detached from the supporting body, FIG. 3 is a partial perspective view illustrating how the cutting inserts are adjusted relative to an adherent cassette, FIG. 4 is a partial perspective view showing a detail of the cassette.

Figure 1:
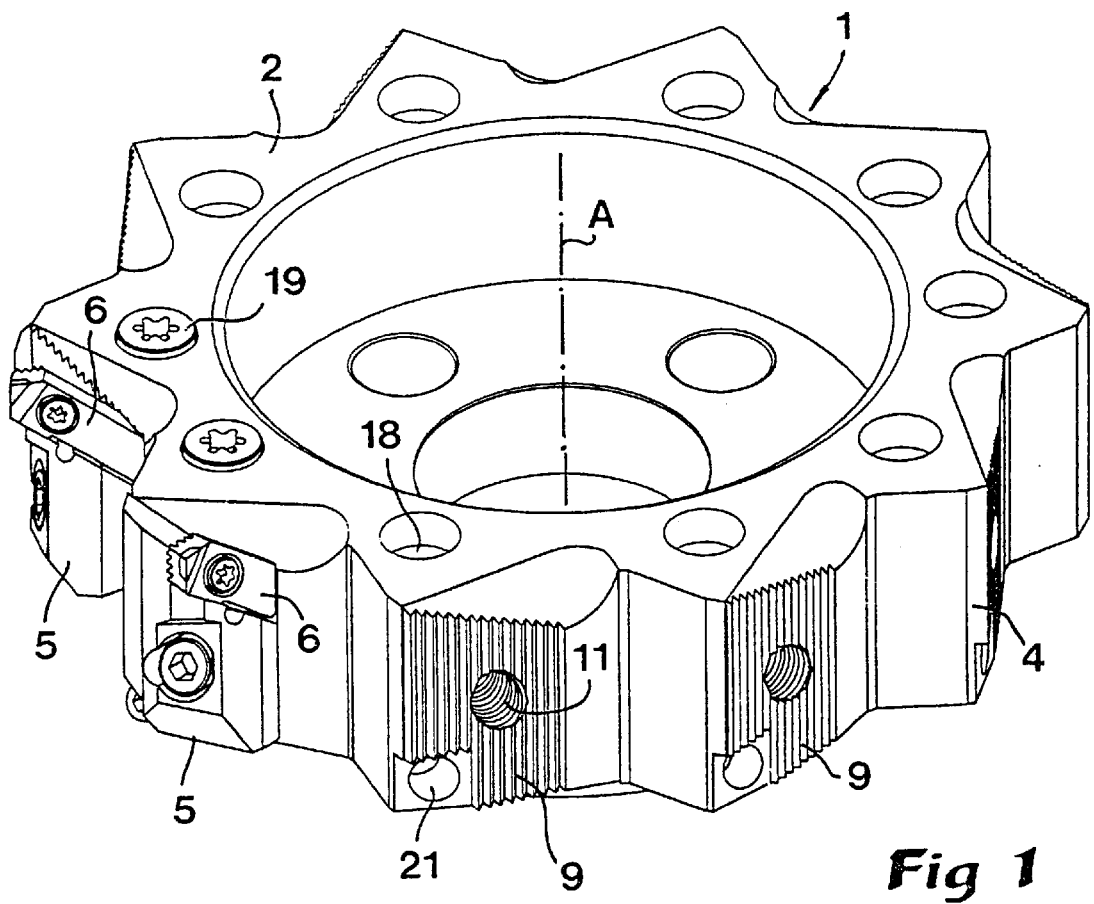
FIG. 1 is a perspective view of a milling tool in accordance with the invention, the cutting inserts being applied to special cassettes, said tool being disclosed with all the cassettes, except two, removed from the supporting body.

As will be apparent from the foregoing description, the present invention uses means that enables a quick and simple fine adjustment of the cutting inserts in both the axial and the radial directions.

DETAILED DESCRIPTION OF PREFERRED EMBODIMENTS OF THE INVENTION

In each of the two embodiments exemplified in the drawings and described below, each individual cutting insert is mounted directly on a special cassette that in turn is mounted on the supporting body of a milling cutter head. Thus, the insert is indirectly mounted on the supporting body. However, the invention is applicable also in the case when the cutting insert is mounted directly upon the supporting body, i.e., without any intermediate cassette.

The milling tool illustrated in FIGS. 1–4 comprises a supporting body 1 that is rotatable around a central geometrical axis A, said supporting body 1 having a cylindric basic shape (said supporting body often also being designated a milling cutter head by persons skilled in the art). Between opposite, planar end surfaces 2, 3 (see both FIGS. 1 and 2) there is thus an endless, circumferential surface 4 which does not constitute a cylindric or smooth surface, but has the character of an envelope surface. Upon said envelope surface or circumferential surface 4 several cassettes 5 are provided. Each cassette 5 supports a cutting insert 6. Thus, the supporting body I and cassettes 5 together constitute a carrier for the inserts 6. (Alternatively, the supporting body alone could constitute the carrier, as will be explained later.) The tool according to the example constitutes a corner cutter, each cutting insert 6 including two cutting edges 7, 8 extending at an angle relative to each other. The edge 7 extends parallel to the axis of rotation A of the supporting body, and the edge 8 extends perpendicular thereto. In practice, the edge 7 constitutes a major cutting edge that performs the actual material machining of the workpiece, while the edge 8 constitutes a minor cutting edge for the purpose of guaranteeing that the exposed surface of the material is flat and smooth. As regards the minor cutting edge 8 it should be pointed out that said edge is short (in practice it is called a wiper flat) and extends exactly perpendicular to the major cutting edge 7, while a portion 8', extending inside of the edge 7, forms a somewhat inclined clearance portion. However, for scale reasons it is not possible to clearly distinguish the wiper flat 8 from the clearance portion 8'.

So far described, the disclosed milling tool is in all essentials previously known.

The individual cassette 5 is connectable with the supporting body via a pair of cooperating, serrated surfaces 9, 10, a first one of said surfaces 9 constituting a serrated body surface and being provided at the circumferential surface of the supporting body, and the second one of the surfaces 10 constituting a serrated cassette surface and provided at an inner side of the cassette. In a previously known way each serrated surface or serration consists of several oblong, axially oriented and parallel ridges that are separated by intermediate grooves, said ridges of one serration engaging the grooves of the other serration. The ridges and grooves extend parallel to the axis A. The serrated surface 9 should extend along a major portion of the axial extension of the supporting body (i.e. the entire distance between opposite planar surfaces 2, 3) and have a width or tangential extension that corresponds to the width of the cassette 5. The serration 10 at the inner side of the cassette should extend along both the entire length as well as the entire width of the cassette.

For each cassette a threaded hole 11 is provided in the supporting body 1, said threaded hole 11 opening in the serrated surface 9. Further, in the cassette 5 a through-hole 12 is provided for receiving a solid clamping screw 13 that is allowed to be tightened in the threaded hole 11. In the embodiment, a screw is used that includes a threaded shaft and a head 14 having a recessed grip 15 for an Allen key. The hole 12 has on one hand a narrow inner section through which the shaft of the screw is allowed to pass, and on the other hand a wider outer section that provides a recess 16 adapted to accommodate the head 14 of the screw. A bottom 17 of the recess 16 provides an abutment surface for the head of the screw to be tightened against. The hole 12 has an oblong shape in order to allow the cassette to be displaced to some degree relative to the screw (when loose) in the axial direction of the supporting body.

Among persons skilled in the art, it is well known that components that are detachably mounted upon a rotatable supporting body constitute a latent security risk in that under unfortunate circumstances said components may loosen from the supporting body and be thrown away at high power if the supporting body is driven at high speed of rotation. Although it is sufficient to tighten the clamping screw 13 by a predetermined torque, a further measure has been taken, in connection with the milling tool according to the invention, to provide a securing of the clamping screw against centrifugal forces. Thus for each cassette and clamping screw a secondary, threaded hole 18 is formed in the supporting body 1. This secondary hole opens on one hand in the planar end surface 2 and on the other hand in the primary hole 11. In the secondary hole 18 there may be inserted on one hand an auxiliary screw 19, said screw being accessible from the outside, and on the other hand a press body 20 that in response to a tightening of the auxiliary screw in the hole 18 is urged against the threaded shaft of the clamping screw 13. In practice, the press body 20 is preferably made of copper or other material which is soft in relation to steel, that will not damage the steel thread of the clamping screw 13. Since the auxiliary screw 19 is not subjected to any centrifugal forces, said auxiliary screw will, after tightening, guarantee a satisfactory securing of the clamping screw 13, even if said screw is subjected to high centrifugal forces.

In accordance with a preferred embodiment of the invention a special mechanism is provided in order to facilitate axial fine adjustment of the cassette 5 relative to the supporting body 1. The mechanism may be realized in different ways but is in the embodiment in the shape of a screw having on one hand a threaded shaft (not visible), that may be engaged in a threaded hole 21 of the supporting body and on the other hand a head 22 having an outwards facing recess 23 for receiving a multi-lobed key. It is characteristic of this screw that the envelope surface of the head 22 is asymmetric in relation to the center axis of the shaft. For instance, the envelope surface may be cylindrical and the head is generally eccentric relative to the shaft. The envelope surface may also have oval shape. As is evident from FIG. 4 the envelope surface of the head of the screw is located in contact with a transverse abutment surface 24 of the cassette 5. When the screw is subjected to a turning movement, the head 22 of said screw will be able to displace the cassette by small or fine axial movements.

A second surface 25 extends at an angle to the abutment surface 24 that together with said second surface 25 defines a corner recess in the cassette. In the area of this corner recess the cassette has a projecting flange portion 26 that partly covers the circumferential (radially facing) portion of the head 22 of the screw. By the presence of this flange portion 26 the screw is given a securing against centrifugal forces. In other words said screw may not be thrown away from the milling tool even if said tool is rotated at high speed.

In the embodiment the cutting insert 6 consists of a steel body having an integrated smaller element 6' of a material having extraordinary high hardness and high wear resistance, e.g. a material that wholly or partly comprises diamond or cubic boron nitride. The above-mentioned cutting edges 7, 8 are provided upon said element 6' constituting the actual edge of the cutting insert.

The cutting insert 6 is connectable with the cassette by means of a second pair of serrated surfaces 27, 28 of which a first one 28 is designated a serrated insert surface and provided at an inner side of the cutting insert 6, while the other one 27 is designated a serrated carrier surface and provided at a free end of the cassette. In conformity with the above-mentioned serrated surfaces 9, 10, said serrated surfaces 27, 28 comprise oblong ridges separated by grooves. The serrated surface 28 preferably extends along the entire inner side of the cutting insert 6, said serrated surface 27 having a size that essentially corresponds to the size of the serrated surface 28. According to the embodiment a threaded hole 29 of a clamping screw 30 opens in the serrated surface 27, said clamping screw 30 being intended to secure the cutting insert to the cassette. Apart from a threaded shaft 31 said screw has a head 32 having an outwards facing recess 33 for receiving a suitable key. In the cutting insert 6 a through hole 34 is provided, which, like the hole 12, is of oblong shape in order to enable displacement of the cutting insert relative to the screw. Also in this case the hole has a recess for the head of the screw. Said head may be tightened against an annular abutment surface 35 at the bottom of the recess.

As is evident from FIGS. 2 and 3 the cutting insert 6, along one of its longitudinal sides, has a set of teeth 36 that in a mounted position of the cutting insert is facing a partially circular recess 37 in a wall surface 38, that defines a seat for the cutting insert 6. As is indicated at 39 a multi-lobed key may be introduced in the recess 37 in order to engage the set of teeth 36. It is obvious that the cutting insert is displaceable to and fro relative to the cassette by turning of this key.

Characteristic of the invention is that the ridges and grooves of the first pair of serrated surfaces 27, 28 are inclined in relation to the serrated surfaces 9, 10 and thus also in relation to an imaginary plane P that extends perpendicular to the axis of rotation A. More precisely, the serrated surfaces 27, 28 are inclined relative to said plane at an angle that constitutes half of the angle between the cutting edges 7, 8. In order words the inclination of the serrated surfaces corresponds to a bisector angle between the cutting edges 7, 8. If the angle between the edges 7, 8 is 90°, as exemplified in the drawings, then the serrated surfaces should accordingly be inclined at an angle of 45° relative to said plane P. If the angle between the edges is for instance 120° the serrated surfaces should extend at an angle of 60° relative to said plane.

The fine adjustment of each one of the cutting inserts 6 of the milling tool is effected in the following way. After loosely fastening the cassette 5 to the body and loosely clamping the cutting insert 6 to the cassette, the two screws 13, 30 are initially slightly tightened in the respective threaded holes. In a first step the cutting inserts are adjusted in a radial direction. This is effected by displacing the cutting insert 6 relative to the adherent cassette by means of the key 39. More precisely, the cutting inserts are displaced either outwards or inwards at an angle of 45° relative to the longitudinal direction of the cassette. When all of the cutting inserts have been adjusted and calibrated, i.e. they are positioned (within a tolerance area of e.g., 0.01 mm) with the cutting edge 7 exactly at the desired radial distance from the axis of rotation of the supporting body, the screw 30 is finally tightened. At this stage, when the clamping screw 13 of the cassette still is only slightly tightened, the cutting insert may not be displaced in the radial direction relative to the supporting body. In the next step the cutting insert is adjusted also in the axial direction. This is effected by means of the head 22 of the screw that upon being turned produces axial displacement of the cassette by extremely fine increments. When the cassette has reached the exact desired axial position, the clamping screw 1 3 is finally tightened. In a final step the auxiliary screw 19 is, together with the press body 20, introduced into the secondary hole 18 in order to secure the clamping screw against centrifugal forces.

A basic advantage of the milling tool according to the present invention is that the double sets of serrated surfaces, that extend at an angle to each other corresponding to one-half of the angle formed between the cutting edges (e.g., 45°, when the setting angle is 90°), allow a simple and time-saving fine adjustment of the cutting inserts of the tool in both the axial and the radial directions.

Figure 5:
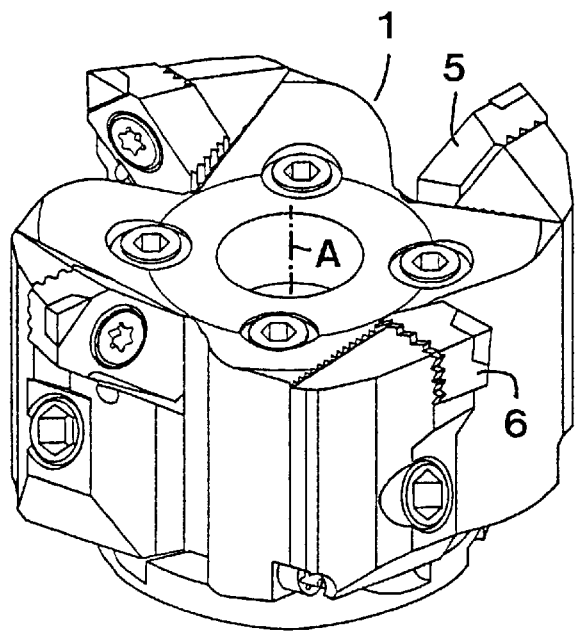
FIG. 5 is a perspective view of a milling tool according to a further embodiment of the invention.

In FIG. 5 another embodiment is illustrated that in principle differs from the embodiment according to FIGS. 1–4 in such a way that each serrated surface 9A (and thus each cassette 5) extends generally radially relative to the axis of rotation of the supporting body.

As pointed out initially, the invention is also applicable without using the above-mentioned cassettes 5. It is thus possible to provide the serrated surface 27 directly upon the supporting body 1, said serrated surface 27 being intended to cooperate with the serrated surface 28 of the cutting insert. In other words, the supporting body 1 alone could constitute a carrier for the inserts. More precisely, the serrated surface of the supporting body is designed to have its grooves extending at the angle to the above-mentioned plane P that constitutes half of the setting angle of the cutting edges. For instance, if the setting angle were 90° the serrated surface of the supporting body would be inclined at an angle of 45° in an arbitrary plane that extends perpendicular to the axis of rotation. If the two cooperating serrated surfaces are manufactured with a sufficiently accurate precision then the cutting inserts may be fined-adjusted both in radial and axial directions by means of a simple displacement movement of the cutting inserts in direction of the grooves of the serrated surfaces. In other words, radial and axial fine adjustment of each individual insert is carried out by one single adjusting operation.

Feasible Modifications of the Invention

The invention is not solely limited to the embodiments described and disclosed in the drawings. It is thus possible to effect displacement of the cutting inserts relative to the fixed serrated surface (on the cassette or directly on the supporting body) in a way other than by the aid of an oblong hole and a screw that is secured axially immovable in the cassette (or the supporting body). It is thus possible instead to use a screw having on one hand a threaded shaft that may be tightened in a conventionally threaded hole in the cutting insert and on the other hand a head accommodate in an inner cavity in the supporting body, a hole extending out of the inner cavity being oblong in order to allow the screw, and consequently the cutting insert, to move along the fixed serrated surface. Also, the clamping screw 30 of the cutting insert may be secured against centrifugal forces, e.g. in the same way as the clamping screw 13 of the cassette.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A milling tool comprising a carrier rotatable about a central axis the carrier including a plurality of serrated carrier surfaces spaced circumferentially about the axis; a plurality of cutting inserts each having serrated insert surface, each insert having its respective serrated insert surface meshed with a respective serrated carrier surface and the slidable therealong in a direction of insert adjustment, each of th serrated carrier surfaces and the serrated insert surfaces comprising straight parallel ridges alternating with straight parallel grooves; each cutting insert including two cutting edges forming a setting angle with each other; one of the cutting edges lying in a reference plane oriented perpendicularly to the axis; the ridges and grooves of the serrated surfaces extending at an angle relative to the reference plane which substantially equals one-half of the setting angle; and fasteners for detachably securing respective inserts to the carrier, each fastener comprising a screw arranged to be tightened and loosened in a direction of screw movement extending perpendicularly relative to the direction of insert adjustment, the screw arranged to directly impart a clamping force to the insert in the direction of screw movement.

2. The milling tool according to claim 4 wherein the carrier comprises a supporting body rotatable about the axis, and a plurality of cassettes mounted on the supporting body and formed with the serrated carrier surfaces.

3. The milling tool according to claim 2 wherein the supporting body includes a plurality of circumferentially spaced serrated body surfaces; each cassette including a serrated cassette surface meshing with a respective serrated body surface; the serrated cassette surface including alternating straight parallel ridges and grooves oriented non parallel to the ridges and grooves of the respective serrated carrier surface; and a fastener for securing each of the cassettes in adjusted positions relative to the supporting body.

4. A milling tool comprising a carrier rotatable about a central axis, the carrier including a plurality of serrated carrier surfaces spaced circumferentially about the axis; a plurality of cutting inserts each having a serrated insert surface, each insert having its respective serrated insert surface meshed with a respective serrated carrier surface; each of the serrated carrier surfaces and the serrated insert and the serrated insert surfaces comprising straight parallel ridges alternating with straight parallel grooves; each cutting insert including two cutting edges forming a setting angle with each other; one of the cutting edges lying in a reference plane oriented perpendicularly to the axis; the ridges and grooves of the serrated surfaces extending at an angle relative to the reference plane which substantially equals one-half of the setting angle; and fasteners for detachably securing respective inserts to the carrier, wherein each serrated carrier surface has a threaded through-hole formed therein, each insert including an oblong through-hole and threadedly secured in a respective one of the threaded holes; the oblong through-hole and threadedly the same angle relative to the reference plane as the ridges and grooves to enable the inserts to be adjusted relative to the fasteners.

5. The milling tool according to claim 4 wherein each screw includes a head disposed in the respective oblong through-hole and abutting an abutment surface thereof.

6. The milling tool according to claim 4 wherein each insert includes a row of teeth, the carrier including a recess for receiving a rotary key adapted to mesh with the teeth for displacing the insert relative to the carrier.

7. A milling tool comprising a carrier rotatable about a central axis, the carrier including a plurality of serrated carrier surfaces spaced circumferentially about the axis; a plurality of cutting inserts each having a serrated insert surface, each insert having its respective serrated insert surface meshed with a respective serrated carrier surface; each of the serrated carrier surfaces and the serrated insert surfaces comprising straight parallel ridges alternating with straight parallel groves; each cutting insert including two cutting edges forming a setting angle with each other; one of the cutting edges lying in a reference plane oriented perpendicularly to the axis; the ridges and grooves of the serrated surfaces extending at an angle relative to the reference plane which substantially equals one-half of the setting angle; and fasteners for detachably securing respective inserts to the carrier, wherein each insert includes a row of teeth, the carrier including a recess for receiving a rotary key adapted to mesh with the teeth for displacing the insert relative to the carrier.

\* \* \* \* \*